United States Patent [19]

Moraru et al.

[11] Patent Number: 4,724,370
[45] Date of Patent: Feb. 9, 1988

[54] SERVO SYSTEM FOR A DISK DRIVE

[75] Inventors: Alex Moraru, Fremont; Kechen Cheng, Sunnyvale, both of Calif.

[73] Assignee: Konishiroku Photo Industries Co., Ltd., Tokyo, Japan

[21] Appl. No.: 918,501

[22] Filed: Oct. 14, 1986

[51] Int. Cl.$^4$ .............................................. G05B 13/00
[52] U.S. Cl. ..................................... 318/561; 318/632; 318/687; 360/78
[58] Field of Search ............... 318/617, 636, 632, 561, 318/687; 360/78

[56] References Cited

U.S. PATENT DOCUMENTS

| | | | |
|---|---|---|---|
| 3,854,081 | 12/1974 | Benaglio | 318/636 |
| 4,031,443 | 6/1977 | Droux | 318/617 X |
| 4,090,112 | 7/1978 | Klinger | 318/617 X |
| 4,135,217 | 1/1979 | Jacques et al. | 318/617 X |
| 4,357,566 | 11/1982 | DuVall | 318/636 |
| 4,379,256 | 4/1983 | Maury | 318/636 X |
| 4,412,165 | 10/1983 | Case et al. | 318/636 |
| 4,562,562 | 12/1985 | Moriya et al. | 318/617 X |

Primary Examiner—Benjamin Dobeck
Attorney, Agent, or Firm—Thomas E. Schatzel

[57] ABSTRACT

A servo system intermittently samples servo sectors from a data disk to obtain the position of the read/write head and to maintain an on-track alignment. A glass scale measures the movement of the transducer head and provides a velocity signal. An integrator integrates the velocity signal to produce a fill-in position signal. This fill-in position signal is added to the position signal from the last sampled servo sector to provide a position compensator with position information when the head is in between servo sectors. An on-track detector circuit and a damping circuit heavily damp movement of the transducer head when the head is in the on-track position. A gain circuit modifies the signal going to the position compensator in order to compensate for misclamping and imperfections in the data disk. The position compensator includes a tilt circuit which compensates for tilting of the disk drive from a non-horizontal position.

8 Claims, 4 Drawing Figures

Fig_1

Fig-2

Fig_3

Fig. 4

SERVO SYSTEM FOR A DISK DRIVE

BACKGROUND OF THE INVENTION

1. Field of the Invention

This invention relates generally to data disk drive systems and more specifically to servo systems for disk drive systems which use flexible disks.

2. Description of the Prior Art

In electronic computer technology, it is common to store data in binary form on the face of a rotatable disk. The face of the disk is coated with a magnetizable substance such as iron oxide. The disks are operated by rotating them like phonograph records and the binary data is encoded upon, or retrieved from, the face of the disk by a movable magnetic transducer device called a read/write or transducer head. The binary information is encoded on the face of the disk in concentric rings, called tracks, and the read/write head can move radially along the disk face to select a particular track to record or retrieve information. The data disks can be rigid or flexible.

These rigid disks typically have data densities of about five hundred tracks per inch of radius of the disk. The flexible disks typically have densities of forty-eight or ninety-six tracks per inch. Because of the high density, precise positioning of the read/write head is necessary so that the head can accurately gain access to a particular desired track on the surface of the disk.

One method of obtaining precise positioning is described in the co-pending application for a "Servo Synchronization Method and Apparatus for a Magnetic Disk" by Hubert Song which is assigned to the same assignee. In this system, the disks have servo sectors which alternate with data sectors. The servo sector tracks contain positioning data to help the transducer head stay on the data track. The servo tracks are radially off-set from the data tracks such that a transducer head passes between two servo tracks when it is positioned along a data track.

The consecutive servo tracks alternate between having an "A" burst and a "B" burst. The transducer head reads the "A" and "B" bursts from the servo tracks on either side. The intensities of the "A" and "B" bursts are measured and the head is adjusted to keep the head midway between the servo tracks and directly on the data track.

One problem with this type of servo system is that there are a limited number of servo sectors per revolution of the disk. The servo system of the disk drive thus has only a limited number of position samples it can make per revolution. Few samples means that it is harder to keep the head on track, especially on high track density disks. One solution is to include more servo sectors on each disk and thus increase the amount of position sampling per revolution of the disk. However, an increase in the number of servo sectors leads to a corresponding decrease in the space available for storing data in the data sectors.

Another problem with servo systems of the prior art involves misalignment of the disks. The disks may not be perfectly centered about their spindle hole when they are clamped in the disk drive. If the disk is off center, the disk track will oscillate radially inward and outward once per revolution. For a disk rotating at six hundred rpms, this oscillation occurs ten times per second or ten hertz. The head is harder to keep on track when this occurs.

A similar problem is caused by disks which become noncircular in shape due to the temperature or humidity. These oval shaped disks will have tracks which oscillate radially inward and outward twice per revolution. For a disk rotating at six hundred rpms, this oscillation occurs twenty times per second or twenty hertz.

Servo systems with linear coil motors have problems when the disk drive is tilted at an angle to the horizontal. The servo systems of the prior art are not able to adjust to provide increased force necessary to keep the head on track when the disk drive is tilted. Prior art systems experience trouble keeping the head on track with tilts of as little as five degrees.

SUMMARY OF THE PRESENT INVENTION

It is an object of the present invention to provide a servo system with improved tracking capabilities.

It is another object of the present invention to provide a servo system which can compensate for imperfections in the data disk.

It is a further object of the present invention to provide a servo system which can compensate for tilting of the disk drive.

Briefly, in a preferred embodiment, the present invention includes a sample and hold circuit for storing the "A" and "B" servo bursts which are read from the servo sectors. A difference circuit is connected to the sample and hold circuit and detects the difference in intensity of the "A" and "B" bursts. An on-track detection circuit is connected to the difference circuit and determines if the head is on-track. A gain circuit is connected to the difference circuit and modifies the signal from the difference circuit to compensate for misclamping and flaws in the data disk. A slope circuit is connected to the gain circuit and selects a slope signal. A position compensator and tilt hold circuit is connected to the slope circuit. The position compensator modifies the position signal from the slope circuit and provides biasing to compensate for any tilt in the system.

A glass scale measures the position of the head on the disk and outputs signals responsive thereto. A velocity circuit is connected to the glass scale and determines a measured velocity based on the signals from the glass scale. An integrator circuit is connected to the velocity circuit and integrates the velocity signal from the velocity circuit to produce a fill-in position signal. The position signal from the sloped circuit and the fill-in position signal from the integrator circuit are added at the position compensator. The resulting desired position mode velocity signal is passed on to an adder circuit which compares the desired position mode velocity signal to the measured velocity signal from the velocity circuit. The adder circuit then sends an error signal to a velocity compensator. The velocity compensator then sends a motor control signal to a linear motor which in turn moves the head and keeps it on track.

It is an advantage of the present invention in that it provides a servo system with improved tracking capabilities.

It is another advantage of the present invention in that it provides a servo system which can compensate for misclamping and imperfections in the data disk.

It is a further advantage of the present invention in that it provides a servo system which can compensate for tilting of the disk drive.

These and other objects and advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
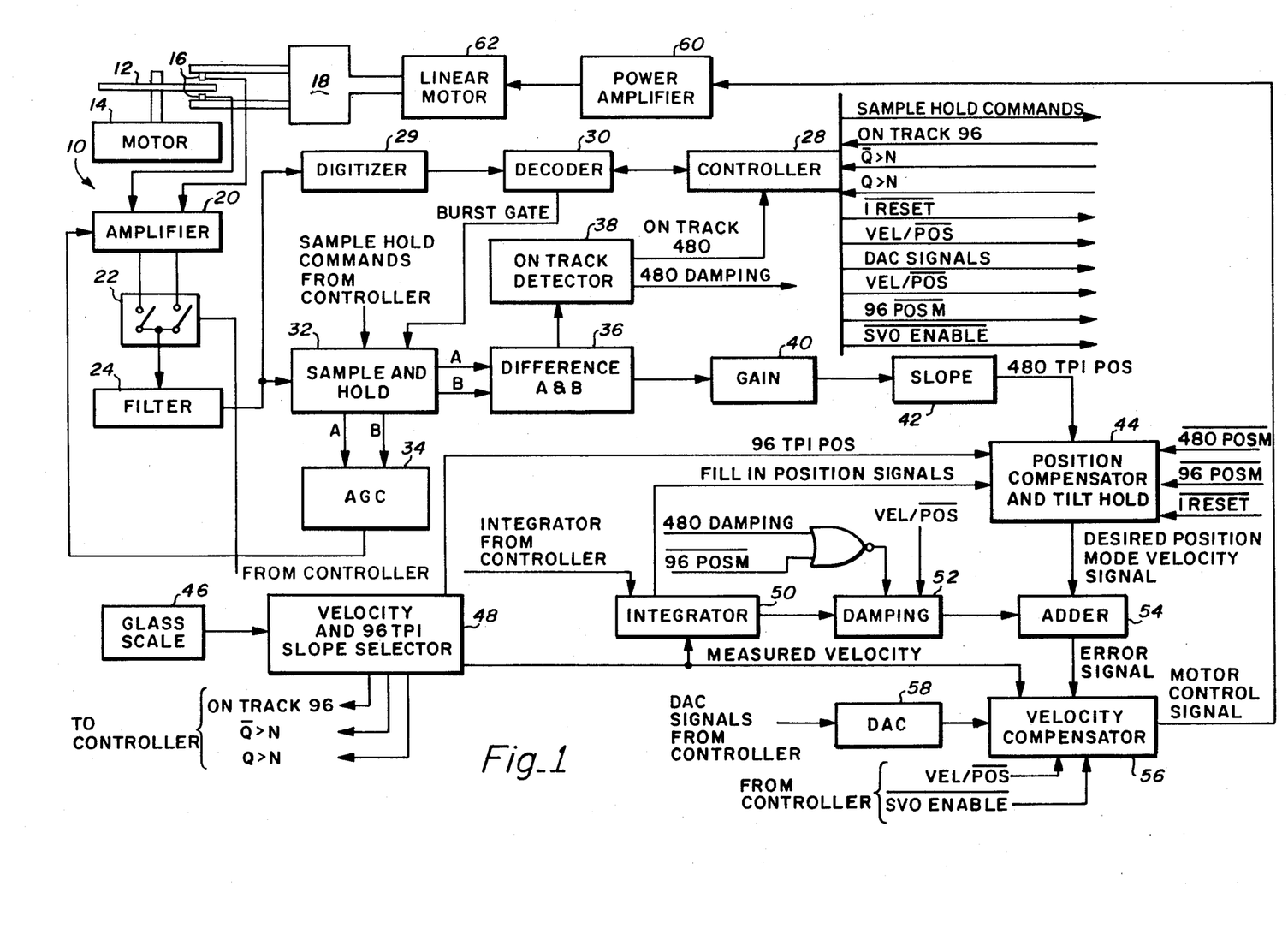
FIG. 1 is a circuit diagram of the servo system of the present invention.

FIG. 1 shows a circuit diagram of the servo system of the present invention and is designated by the general reference number 10. A flexible magnetic data disk 12 is rotated by a motor 14. A pair of transducer heads 16 are positioned over the surface of the disk 12 and are attached to a carriage arm 18.

An amplifier 20 is connected to the transducer heads 16 and amplifies the signals from the heads 16. A switch 22 is connected to amplifier 20 and controls which head signals are to be used. A filter 24 is connected to switch 22 and provides filtering for the head signals. Switch 22 is controlled by a controller 28.

A digitizer 29 is connected to filter 24 and digitizes the analog head signals. A decoder 30 is connected to digitizer 29 and reads the digitized head signals in a servo sector of the disk and generates timing windows for reading the servo information. These timing windows are sent to the controller 28. A sample and hold circuit 32 is connected to filter 24 and stores the "A" and "B" servo bursts read by head 16. An automatic gain control (AGC) 34 is connected to the sample and hold circuit 32. AGC 34 measures the intensity of the sampled "A" and "B" servo bursts and sends an AGC control signal to the amplifier 20 to adjust the gain.

A difference circuit 36 is connected to the sample and hold circuit 32 and produces a signal corresponding to the difference in intensities of the sampled "A" and "B" servo bursts. An on-track detector 38 is connected to the difference circuit 36. On track detector 38 determines from the difference signal whether the head is on-track or not, and sends an on-track signal to controller 28.

A gain circuit 40 is connected to difference circuit 36 and modifies the gain of the difference signal to compensate for misclamping and disk imperfections. A slope circuit 42 is connected to gain circuit 40 and selects the slope of the signal from the gain circuit 40 in order to produce a four hundred eighty tracks per inch (TPI) position signal. A position compensator and tilt hold circuit 44 is connected to the slope circuit 42 and outputs a desired position mode velocity signal which also compensates for tilt.

A glass scale 46, also called a linear optical encoder, is attached to the carriage 18 and provides output signals responsive to the movement of the carriage 18. An etched metal plate scale could be used in place of the glass scale 46. A velocity and ninety-six TPI slope select circuit 48 is connected to the glass scale 46. Velocity and ninety-six TPI slope select circuit 48 produces a ninety-six TPI position signal and a measured velocity signal. An integrator 50 is connected to velocity and ninety-six TPI slope selector circuit 48 and position compensator 44 and integrates the measured velocity signal to produce a fill-in position signal. The fill-in position signal is added to the four hundred eighty TPI position signal in the position compensator 44. A damping circuit 52 is connected to the integrator 50. The damping circuit 52 damps the measured velocity signal transmitted to the adder 54 when the on-track detector 38 indicates that heads 16 are on-track. A summing amplifier 54 is connected to the damping circuit 52 and the position compensator and tilt hold circuits 44 and compares the desired position mode velocity position signal to the measured velocity signal and produces an error signal.

A velocity compensator 56 is connected to the adder 54, the velocity circuit 48 and a digital-to-analog converter (DAC) 58. The velocity compensator produces a motor control signal and sends it to a power amplifier 60 which in turn controls a linear motor 62. Linear motor 62 is a linear voice coil motor. Linear motor 62 moves carriage 18 and determines radial position of head 16 relative to disk 12.

The operation of servo system 10 has three modes: a velocity or seek mode, a ninety-six tracks per inch position mode and a four hundred eighty tracks per inch position mode. The present invention can thus be used with both the ninety-six and four hundred eighty tracks per inch type disks.

The velocity or seek mode is well known in the art. The controller 28 knows the position of the heads 16 on disk 12. When a new track is desired, the controller inputs a desired velocity signal to the DAC 58. The DAC 58 turns the digitized desired velocity signal into an analog signal. This desired velocity signal is then passed to the velocity compensator 56 which causes the linear motor 62 to move the heads 16.

The glass scale 46 and the velocity circuit 48 produce a measured velocity signal. The velocity compensator 56 compares the measured velocity signal with the desired velocity signal from the DAC 58. The velocity compensator 56 tries to keep the measured velocity equal to the desired velocity by adjusting the motor control signal accordingly. The rest of the circuits in the servo system 10 remain inactive during the seek mode.

Once the head is on the proper track, the servo system 10 must keep the head on track as the disk 12 is rotated by motor 14. This on-track function is performed by the position modes. The ninety-six tracks per inch (TPI) position mode is used when a ninety-six TPI disk is being used and the four hundred eighty TPI position mode is used when a four hundred eighty TPI disk is being used.

In the ninety-six TPI position mode, the velocity and ninety-six TPI slope selector 48 sends a ninety-six TPI position signal to the position compensator 44. The ninety-six TPI position signal represents the position of the heads 16 on the disk 12 as measured by the glass scale 46. The position compensator 44 sends a desired position mode velocity signal to the adder 54. The adder 54 compares the desired position mode velocity signal with the measured velocity signal and tries to keep them equal by outputting the proper error signal. The adder 54 passes the error signal to the velocity compensator 56. The velocity compensator 56 outputs the motor control signal to the power amp 60 and the linear motor 62.

When a four hundred eighty TPI disk is used, the tracks are much closer together and keeping the heads on track becomes more difficult. A glass scale position signal, as used in the ninety-six TPI position mode, is not accurate enough to use in a four hundred eighty TPI disk. Therefore, the four hundred eighty TPI position mode of this invention uses a periodic sampling of servo sector information.

In the four hundred eighty TPI position mode, the sample and hold circuit 32 receives and stores the "A" and "B" servo bursts. The difference circuit 36 determines the difference in intensity of the "A" and "B" bursts. The gain circuit 40 modifies the signal from the difference circuit 36 to compensate for misclamping and disk imperfections. The slope circuit 42 selects the slope of the signal and produces a four hundred eighty TPI position signal. The position compensator 44 modifies the four hundred eighty TPI position signal and produces a desired position mode velocity signal.

When a servo sector is being read, the integrator 50 is disabled and the fill-in position signal is zero. The desired position mode velocity signal from the position compensator 44 is thus equivalent to the four hundred eighty TPI position signal. The adder 54 compares the measured velocity and the desired position mode velocity signal from the position compensator 44 and produces an error signal. The velocity compensator 56 produces a motor control signal which goes to motor 62 via power amplifier 60. The motor moves the heads 60 to keep them on track.

When the heads 16 are in between servo sectors, the servo system 10 is unable to receive position information from the disk 12. Systems of the prior art would try to hold the head on-track between servo samples based on the information contained in the last servo sector which was read. The present invention is able to produce a position signal between servo sectors. The integrator 50 is used to integrate the measured velocity signal to produce a fill-in position signal. This fill-in position signal is passed to the position comparator 44 and is there added to the four hundred eighty TPI position signal of the last servo sector which was read. The sample position signal is derived from the "A" and "B" burst signals from the preceeding servo sector reading and is stored in the sample and hold circuit 32. Thus, the integrator 50 gives the system 10 position information between servo sector samples and allows accurate adjustment of the head position between samples. This integrated velocity position signal is a unique way to supplement the position information from the servo sectors and provides a more accurate way to keep the head on-track.

Figure 2:
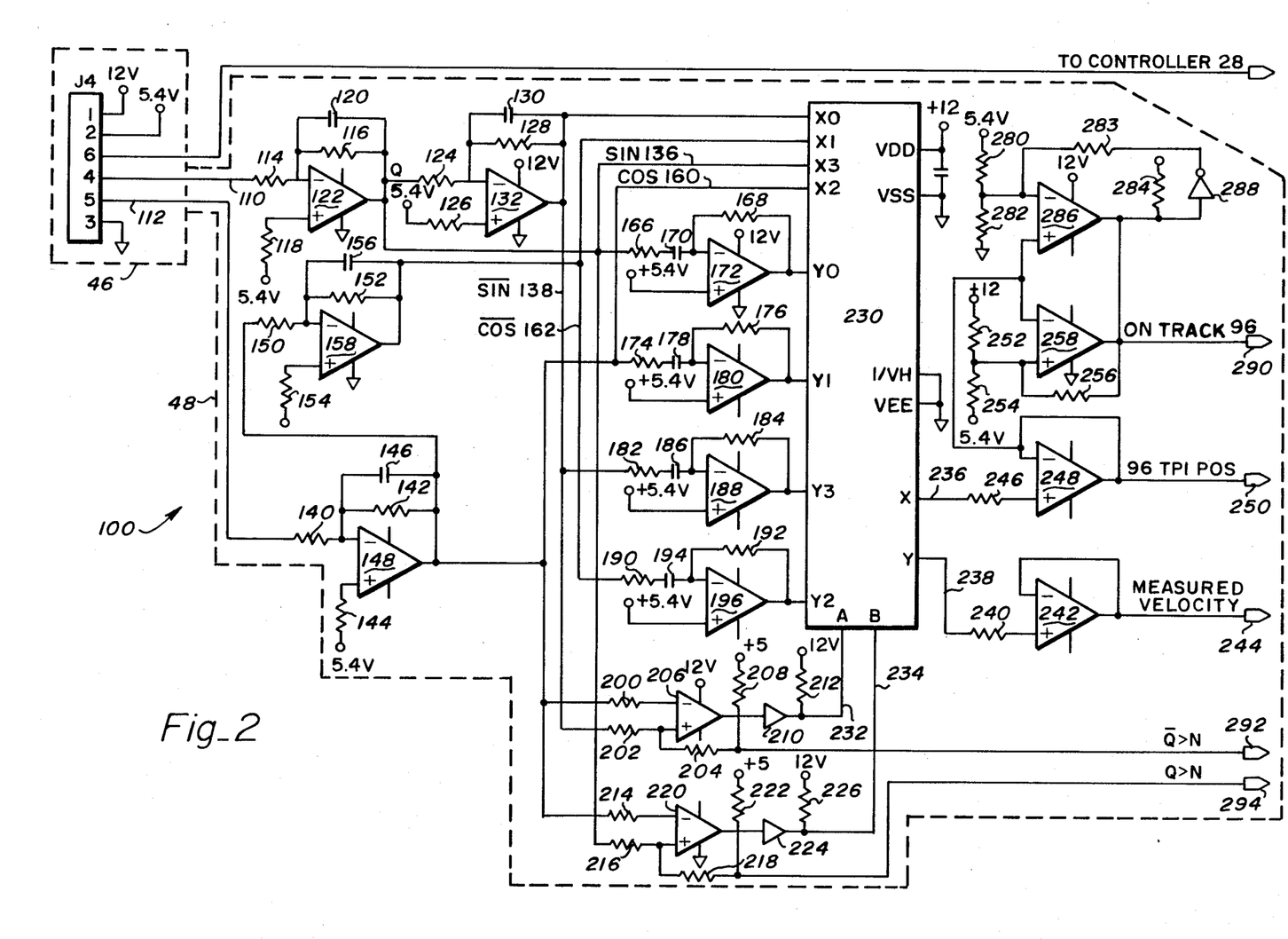
FIG. 2 is a circuit diagram of a first part of the servo system of FIG. 1.

FIG. 2 shows a circuit diagram of a first part of the system 10 of FIG. 1 and is designated by the general reference number 100. Part 100 includes the glass scale 46 and the velocity and ninety-six TPI slope selector 48. The glass scale 46 measures movement of the heads 16. When the heads 16 are positioned over the first track of the disk 12, the glass scale puts out a track zero signal to controller 28. The glass scale produces a sine wave signal on a line 110 and a cosine wave signal on a line 112. The sine and cosine waves represent the position of the heads 16 on disk 12.

The sine wave on line 110 is passed through a buffer network comprised of a resistor 114, a resistor 116, a resistor 118, a capacitor 120, and an amplifier 122. The buffered sine wave is then passed through an inverting network comprised of a resistor 124, a resistor 126, a resistor 128, a capacitor 130, and an amplifier 132. The resulting buffered sine and inverted sine waves are output on a line 136 and 138, respectively.

The cosine wave on line 112 is passed through a buffer network comprised of a resistor 140, a resistor 142, a resistor 144, a capacitor 146, and an amplifier 148. The buffered cosine wave is then passed through an inverting network comprised of a resistor 150, a resistor 152, a resistor 154, a capacitor 156, and an amplifier 158. The resulting buffered cosine and inverted cosine waves are output on a line 160 and 162, respectively.

The sine wave from line 136 is differentiated by a differentiating network comprised of a resistor 166, a resistor 168, a capacitor 170 and an amplifier 172. The cosine wave from line 160 is differentiated by a differentiating network comprised of a resistor 174, a resistor 176, a capacitor 178 and an amplifier 180. The inverse sine wave from line 138 is differentiated by a differentiating network comprised of a resistor 182, a resistor 184, a capacitor 186, and an amplifier 188. The inverse cosine wave from line 162 is differentiated by a differentiating network comprised of a resistor 190, a resistor 192, a capacitor 194, and an amplifier 196.

The cosine wave from line 160 and the sine wave from line 138 are digitized by a network comprised of a resistor 200, a resistor 202, a resistor 204, an amplifier 206, a resistor 208, an amplifier 210, and a resistor 212. The sine wave from line 136 and the cosine wave from line 160 are digitized by a network comprised of a resistor 214, a resistor 216, a resistor 218, an amplifier 220, a resistor 222, an amplifier 224, and a resistor 226.

A double four-to-one multiplexer 230 provides wave selection for both the measured velocity and ninety-six TPI position signals. The multiplexer 230 receives binary signals along a line 232 and a line 234. The two binary signals represent four possible combinations representing one of the four waves. The multiplexer 230 receives the sine, cosine, inverse sine and inverse cosine wave along lines 136, 160, 138 and 162, respectively. The multiplexer 230 has internal switches which switch one of the four waves to a line 236. The wave selected is the one which is not at a peak and is determined by the binary information along lines 232 and 234.

The multiplexer 230 also receives the differentiated sine, cosine, inverted sine and inverted cosine waves. The multiplexer 230 internally selects one of the four waves based upon the binary information from lines 232 and 234 and outputs the selected wave on a line 238. This wave is passed through a buffer comprised of a resistor 240 and an amplifier 242 and is output as the measured velocity signal at a point 244.

The signal on line 236 is passed through a buffer comprised of a resistor 246 and an amplifier 248. The resulting signal is output at a point 250 as the ninety-six TPI position signal. The ninety-six TPI position signal is also passed through a ninety-six TPI on-track detector. The detector includes a high voltage comparator comprised of a resistor 252, a resistor 254, a resistor 256, and an amplifier 258 and a low voltage comparator comprised of a resistor 280, a resistor 282, a resistor 283, a resistor 284, an amplifier 286 and a diode 288. If the ninety-six TPI signal is between a predetermined high and low voltage, then a positive signal is output at a point 290 indicating that the heads 16 are on-track in the ninety-six TPI position mode. This signal then goes to controller 28. The signals on a line 292 and a line 294 are used by controller 28 to detect track crossings.

Figure 3:
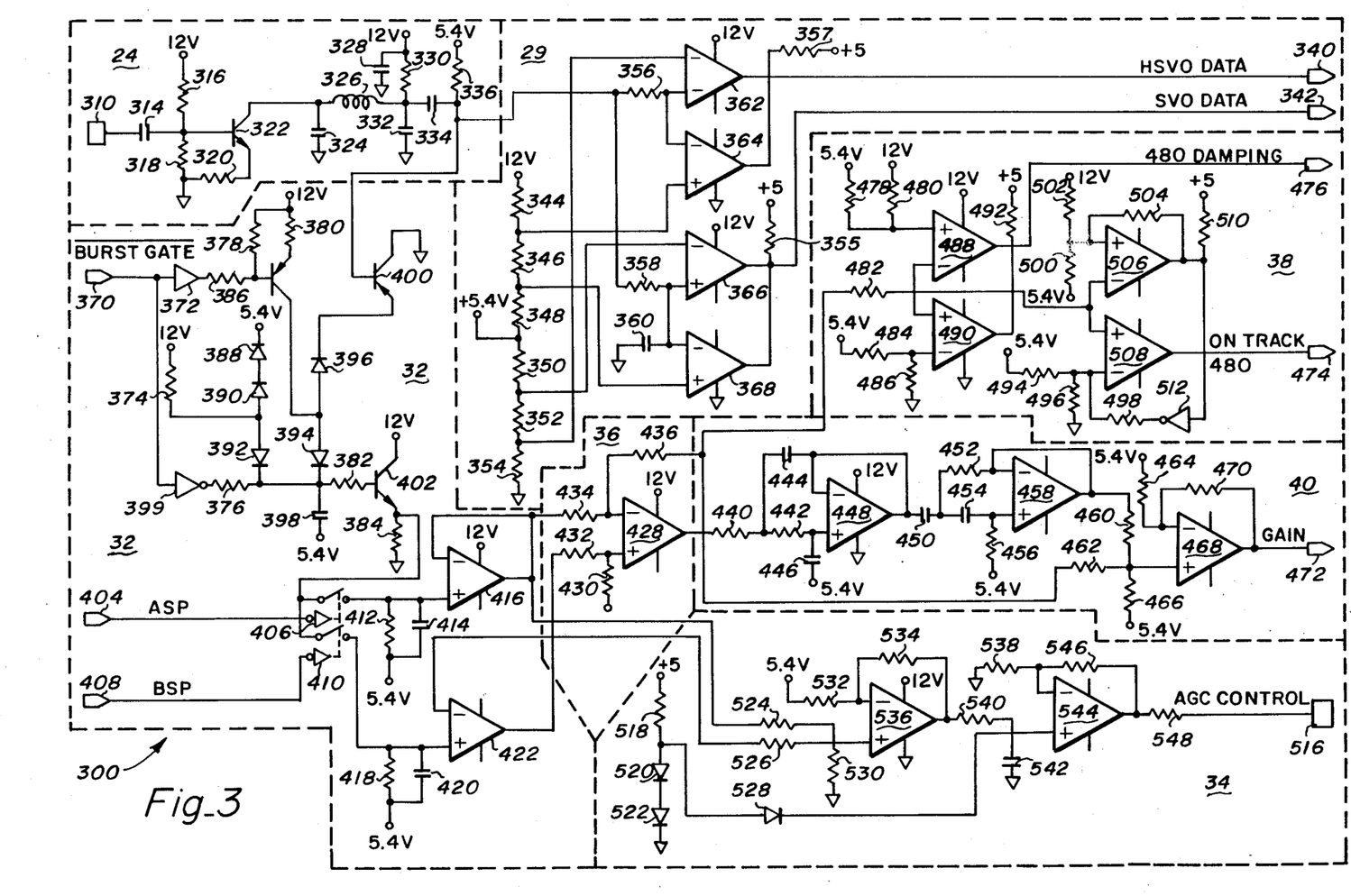
FIG. 3 is a circuit diagram of a second part of the servo system of FIG. 1.

FIG. 3 is a circuit diagram of part of the system 10 and is designated by the general reference number 300. A point 310 receives the servo information read by head 16 from switch 22. The servo information is filtered by filter 24. Filter 24 is comprised of a capacitor 314, a resistor 316, a resistor 318, a resistor 320, a transistor 322, a capacitor 324, an inductor 326, a capacitor 328, a resistor 330, a capacitor 332, a capacitor 334, and a resistor 336.

The digitizer 29 receives the servo information from filter 24 and digitizes the signal for the decoder 30. The digitizer 28 puts out a high threshold signal to a point 340 and a low threshold signal to a point 342. The decoder 30 uses the high threshold signal from point 342 when reading the synchronization servo information used for generating timing windows. The high threshold signal insures that interference signals are screened out. When the decoder 30 reads the "A" and "B" servo bursts, it uses the low threshold signal at point 342. This is because one of the "A" or "B" bursts will be smaller than the other. In order for the servo signal to produce a digitized signal from digitizer 29, a lower threshold must be used. The digitizer 29 is comprised of a plurality of resistors 344, 346, 348, 350, 352, 354, 356, and 358, a capacitor 360, an amplifier 362, an amplifier 364, an amplifier 366, and an amplifier 368.

The sample and hold circuit 32 receives the timing windows for reading the "A" and "B" sample bursts from a point 370. Timing windows, also called a burst gate, from point 370 controls a switching network. This switching network allows the servo information to pass from the filter 24 to the sample and hold circuit 32 during reading of the servo bursts. The switching network is comprised of a buffer 372, a plurality of resistors 374, 376, 378, 380, 382, 384, and 386, a plurality of diodes 388, 390, 392, 394, and 396, a capacitor 398, an inverter 399, a transistor 400, and a transistor 402.

A point 404 receives an "A" sample signal which controls a switch 406. A point 408 receives a "B" sample signal which controls a switch 410. A network comprised of a resistor 412, a capacitor 414, and an amplifier 416 is used to hold the "A" servo burst signal. A network comprised of a resistor 418, a capacitor 420, and an amplifier 422 is used to hold the "B" servo burst signal. Controller 28 closes switch 406 when an "A" servo burst is being read and closes switch 410 when a "B" servo burst is being read.

Difference circuit 36 receives the "A" and "B" bursts from the sample and hold circuit 32 and determines the difference between the two signals. Difference circuit 36 is comprised of an amplifier 428 and a plurality of resistors 430, 432, 434, and 436.

The gain circuit 40 receives the difference signal from difference circuit 36. The gain circuit 40 boosts the gain of the signal to compensate for imperfections in the disk. An off-center disk has a ten hertz error and a noncircular disk has a twenty hertz error for speeds of six hundred rpms. The gain circuit 40 boosts the gain from ten to twenty hertz without increasing the amplitude or effecting the phase margin of the difference signal. The gain circuit 40 has a low pass filter comprised of a resistor 440, a resistor 442, a capacitor 444, a capacitor 446, and an amplifier 448. A high pass filter is comprised of a capacitor 450, a resistor 452, a capacitor 454, a resistor 456, and an amplifier 458. A summing network is comprised of a resistor 460, a resistor 462, a resistor 464, a resistor 466, an amplifier 468 and a resistor 470. Resulting gain signals output at a point 472.

The on-track detector 38 receives the difference signal from the difference circuit 36. The on-track detector 38 analyzes the difference signal and if the signal is between a certain high and low voltage threshold, then an on-track four hundred eighty signal is sent to controller 28 from a point 474. The on-track four hundred eighty signal means that the head 16 is on-track in the four hundred eighty TPI position mode. The on-track detector 38 also determines if the difference signal is in between a second high and low voltage threshold and if so, outputs a four hundred eighty damping signal at a point 476. The four hundred eighty damping signal is used to control a damping feature discussed below. The on-track detector 38 is comprised of a resistor 478, a resistor 480, a resistor 482, a resistor 484, a resistor 486, an amplifier 488, an amplifier 490, a resistor 492, a resistor 494, a resistor 496, a resistor 498, a resistor 500, a resistor 502, a resistor 504, an amplifier 506, an amplifier 508, a resistor 510, and an inverter 512.

The AGC 34 averages the "A" and "B" burst signals from the sample and hold circuit 32 and outputs an AGC control signal at a point 516. The AGC control signal is used by the amplifier 20 to adjust the gain of incoming signals. The AGC control 34 is comprised of a resistor 518, a diode 520, a diode 522, a resistor 524, a resistor 526, a diode 528, a resistor 530, a resistor 532, a resistor 534, an amplifier 536, a resistor 538, a resistor 540, a capacitor 542, an amplifier 544, a resistor 546, and a resistor 548.

Figure 4:
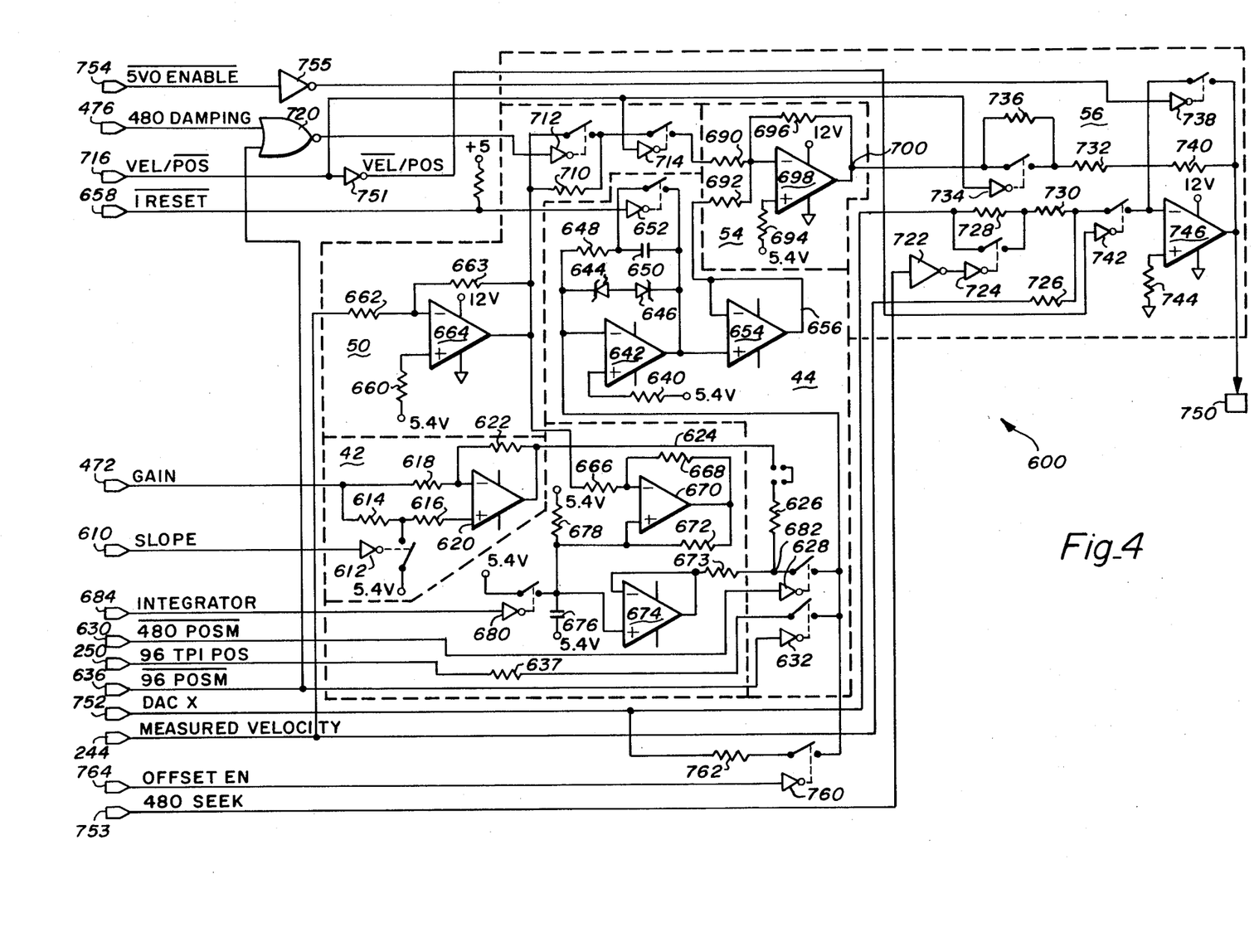
FIG. 4 is a circuit diagram of a third part of the servo system of FIG. 1.

FIG. 4 shows a circuit diagram of part of the system 10 and is designated by the general reference number 600. The slope circuit 42 receives the gain signal from point 472. The slope circuit 42 selects the slope of the gain signal by inverting one slope of the gain signal wave. The slope to be inverted is detemined by controller 28. Controller 28 sends a slope signal to a point 610. Slope signal controls a switch 612 which determines which slope is inverted. For an odd numbered track, controller 28 selects one slope and for an even numbered track, controller 28 selects the other slope. Slope circuit 42 is further comprised of a resistor 614, a resistor 616, a resistor 618, an amplifier 620, and a resistor 622.

The position compensator and tilt hold circuit 44 (position circuit) receives the four hundred eighty TPI position signal from the slope circuit 42 along a line 624. The signal is passed through a resistor 626 and a switch 628. Switch 628 is controlled by an inverse four hundred eighty, POSM signal received at a point 630 from the controller 28. The four hunderd eighty POSM signal means that the system 10 is in the four hundred eighty position mode. If the system 10 were in the ninety-six TPI position mode, switch 628 would be open and a switch 632 would be closed. Switch 632 is controlled by an inverse ninety-six POSM signal at a point 636. If the system 10 is in the ninety-six TPI position mode, then the position compensator 44 receives the ninety-six TPI position signal from point 250 via a resistor 637.

The position compensator 44 is further comprised of a resistor 640, an amplifier 642, a diode 644, a diode 646, a resistor 648, a capacitor 650, a switch 652, and an amplifier 654. The position compensator 44 modifies the four hundred eighty TPI position signal from the slope circuit 42 or the ninety-six TPI position signal from the velocity and ninety-six TPI slope selector circuit 48 and modifies them to produce a desired position mode velocity signal at a line 656.

The position compensator 44 also has a tilt hold feature to compensate for tilt of the disk drive. When the disk drive is tilted, more force is required to be exerted by the linear motor 62 to keep the heads 16 on track. Capacitor 650 stores a charge which is a measure of the bias needed to compensate for the tilt. The capacitor 650 is charged during the initial power-up of the system 10 and is used for all three modes of operation. Switch 652 disables the tilt feature by discharging capacitor 652. Switch 652 is controlled by an inverse I-reset signal at a point 658 from controller 28. During operation the bias on capacitor 652 is normally kept on, even when the system 10 switches between velocity (seek) and position (on-track) modes.

The integrator 50 is comprised of a resistor 660, a resistor 662, a resistor 663, an amplifier 664, a resistor 666, a resistor 668, an amplifier 670, a resistor 672, a resistor 673, an amplifier 674, a capacitor 676, a resistor 678, and a switch 680. The integrator 50 integrates the measured velocity signal from point 244 to provide information of the position movement of the head 16 between reading of the servo sectors when the system 10 is in the four hundred eighty position mode. These integrated signals are called a fill-in position signal. This fill-in position signal is added to the four hundred eighty TPI position signal at a point 682. The fill-in position signal plus the last four hundred eighty TPI position signal from the last servo sector sample reading provides a good approximation of the position of the heads 16. When a servo sector is being read, the four hundred eighty TPI position signal gives the actual present location of the head 16 and the fill-in position signal is not needed. So when the servo sector is being read, the controller 28 sends an integrator signal to a point 684 which closes switch 680 and discharges capacitor 676 and thereby disables the integrator 50.

The adder 54 is comprised of a resistor 690, a resistor 692, a resistor 694, a resistor 696, and an amplifier 698. The adder 54 takes the desired position mode velocity signal from the position compensator 44 and compares it to the measured velocity signal from the damping circuit 52. The adder 54 tries to keep the measured velocity equal to the desired position mode velocity by outputting an appropriate error signal at a point 700.

The damping circuit 52 is comprised of a resistor 710, a switch 712 and a switch 714. During the velocity mode, controller 28 puts out a velocity/inverse position signal at a point 716. This causes switch 714 to open and prevents the measured velocity signal from reaching adder 54. The switch 714 remains closed during a position mode.

The damping circuit 52 has a damping feature. As stated above, the adder 54 puts out an error signal which trys to equalize the measured velocity and the desired position mode velocity. However, if the heads 16 are already close to being on-track, then moving them to correct the position may cause the heads to overshoot the track. So if the heads 16 are close to being on track, the four hundred eighty damping signal from point 476 will cause switch 712 to close and the system 10 will be overdamped. If the heads 16 are very far from the track, then the four hundred eighty damping signal will cause switch 710 to open and system 10 will be underdamped. When the head is very far off-track, the underdamped condition is necessary to allow the head to respond quickly and move toward the track. The ninety-six POSM signal is gated with the four hundred eighty damping signal at a NOR gate 720. The system is underdamped during ninety-six TPI position mode.

The velocity compensator 56 is comprised of an inverter 722, a switch 724, a resistor 726, a resistor 728, a switch 734, a resistor 736, a switch 738, a resistor 740, a switch 742, a resistor 744, and an amplifier 746. When the system 10 is in a position mode, the switch 734 is closed and the error signal from adder 74 is output as a motor control signal to a point 750. Motor control signal goes to linear motor 62 via power amp 60. Switch 734 is controlled by the velocity/inverse position signal from point 716. If the velocity mode is on, switch 734 is open. The error signal from adder 54 then passes through resistor 736. The error signal is still used in the velocity mode because of the need for the biasing from the tilt feature.

When in the velocity mode, switch 742 is closed by an inverse velocity/position signal from an inverter 751. The amplifier 746 then compares the measured velocity signal from point 244 with the desired velocity signal or DAC signal from controller 28 via point 752. The amplifier 746 puts out a motor control signal which tries to keep the measured velocity equal to the desired velocity.

If the velocity mode is seeking a track on a four hundred eighty TPI disk, then switch 724 is kept open. Switch 724 is controlled by a four hundred eighty seek signal sent from controller 28 via a point 753. The DAC signal is then passed through a resistor 728. This allows for lower head speeds when seeking a four hundred eighty TPI track. Switch 738 is closed when a servo enable signal is sent from controller 28 via point 754 and an inverter 755. When switch 738 is closed, the system 10 is disabled.

A switch 760 and a resistor 762 form an off-set network. The off-set feature is used for testing how far off-track a head 16 can be and still read the track. During testing, switch 760 is closed by an off-set enable signal from controller 28 via a line 764. The controller 28 then sends a DAC signal via point 752 through resistor 762 to add to the position signal going to the position compensator 44. By adjusting the DAC signal, the head can be off-set from the on-track position during the position mode.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:
1. A servo system for a disk drive system comprising:
   a. a sample and hold means for storing servo burst signals read from a data disk;
   b. a difference means connected to the sample and hold means for determining the difference between said servo burst signals and for generating a difference signal;
   c. a slope selector means connected to said difference means for selecting a slope of said difference signal and for generating a position signal;
   d. a velocity measurement means for determining the radial velocity of a head of a disk drive and for generating a measured velocity signal;

e. an integrator means connected to said velocity measurement means for integrating said measured velocity signal and for generating a position fill-in signal;

f. a position compensator means connected to the slope selector means and the integrator means for generating a desired position mode velocity signal;

g. an adder means connected to said position compensator means and said velocity measurement means for generating an error signal; and h. a velocity compensator means connected to said adder means for generating a motor control signal.

2. The system of claim 1 wherein,
the integrator means includes an integrator switch, such that the integrator means can be disabled and the generation of said position fill-in signal terminated by a signal from a controller when a servo sector of a disk is being read.

3. The system of claim 1 further including,
an on-track detector means connected to the difference means for determining if said head is within a predetermined distance from an on-track position, and if so, the on-track detector means generates a damping signal; and
a damping means connected to the velocity means, the adder means, and the on-track detector means, for damping said measured velocity signal responsive to said damping signal.

4. The system of claim 1 further including,
a second slope selector means connected to the velocity measurement means and the position compensator means for generating a second position signal to be sent to the position compensator means.

5. The system of claim 1 further including,
a gain means connected intermediate the difference means and the slope selector means for increasing the gain of said difference signal to compensate for misclamping and imperfections in said data disk.

6. The system of claim 1 wherein,
the position compensator means includes a biasing means for modifying said desired position mode velocity signal to compensate for tilting of the disk drive from a non-horizontal position.

7. A servo system for disk drive comprising:
a. a sample and hold means for storing servo burst signals read from a data disk;
b. a difference means connected to the sample and hold means for determining the difference between said servo burst signals and for generating a difference signal;
c. a gain means connected to said difference means for increasing the gain of said difference signal at frequencies equal to the frequencies at which errors occur due to misclamping and imperfections in said data disk;
d. a slope selector means connected to said gain means for selecting a slope of said difference signal and for generating a position signal; and
e. a position compensator means connected to the slope selector means for generating a desired position mode velocity signal.

8. A servo system for a disk drive comprising:
a. a sample and hold means for storing servo burst signals read from a data disk;
b. a difference means connected to the sample and hold means for determining the difference between said servo bust signals and for generating a difference signal;
c. a slope selector means connected to said difference means for selecting a slope of said difference signal and for generating a position signal;
d. a position compensator means connected to the slope selector means for generating a desired position mode velocity signal; and
e. a biasing means connected to the position compensator means for modifying the desired position mode velocity signal to compensate for nonhorizontal tilting of a linear motor in the disk drive.

* * * * *